G. C. HAMMONDS.
COTTON CHOPPER AND CULTIVATOR.
APPLICATION FILED SEPT. 8, 1909.
952,447.
Patented Mar. 22, 1910.
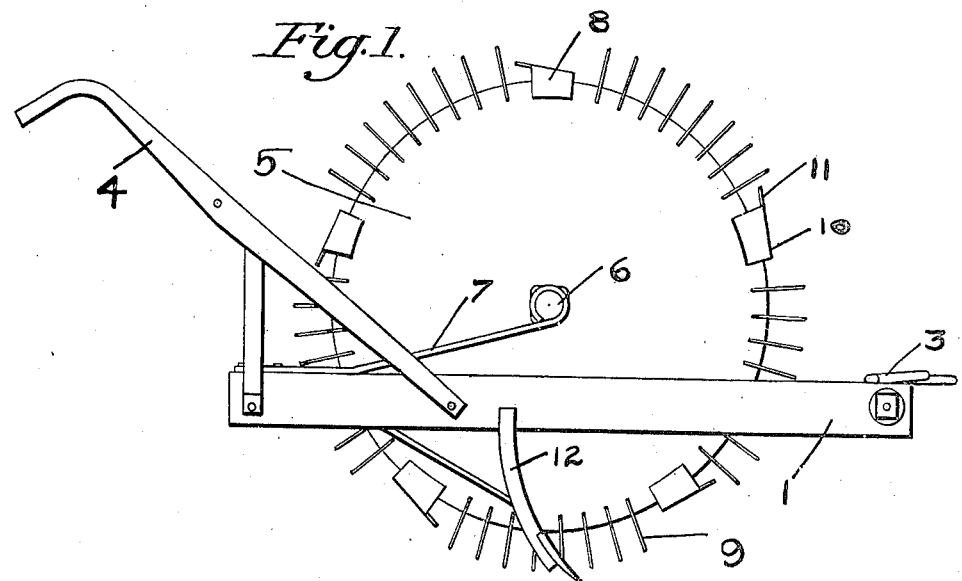
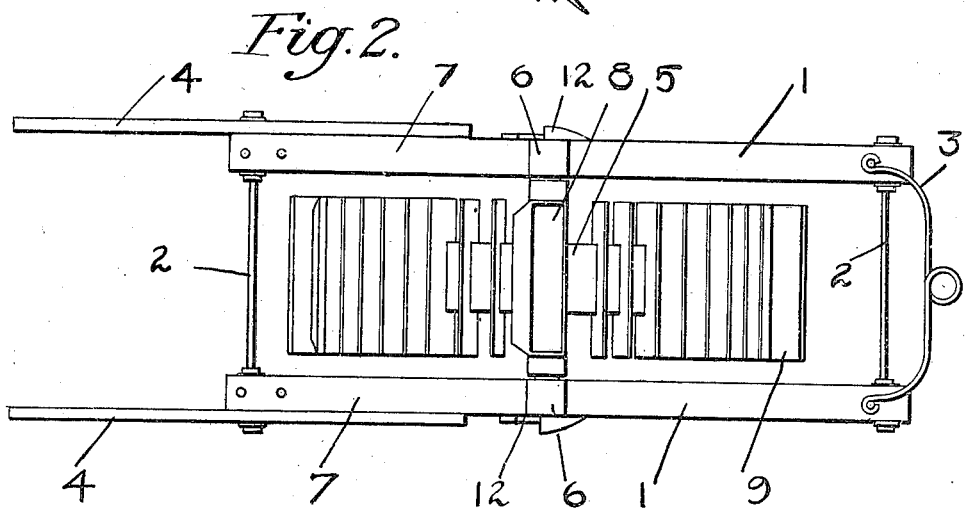
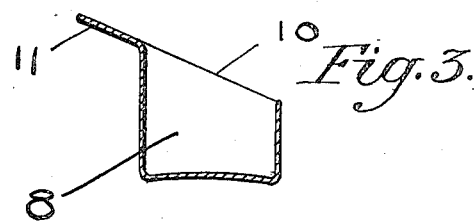

UNITED STATES PATENT OFFICE.

GREEN C. HAMMONDS, OF THOMASTON, GEORGIA, ASSIGNOR OF ONE-HALF TO R. F. DUCKWORTH, OF UNION CITY, GEORGIA.

COTTON CHOPPER AND CULTIVATOR.

952,447.  Specification of Letters Patent.  Patented Mar. 22, 1910.

Application filed September 8, 1909. Serial No. 516,695.

*To all whom it may concern:*

Be it known that I, GREEN C. HAMMONDS, a citizen of the United States, residing at Thomaston, in the county of Upson and State of Georgia, have invented certain new and useful Improvements in Cotton Choppers and Cultivators, of which the following is a specification.

My invention relates to machines for thinning cotton plants and simultaneously cultivating the growing plants and has for its object the provision of a machine provided with a wheel having cups or boxes arranged at intervals around its rim, and the spaces between the cups or boxes provided with radial knives to cut into the soil and destroy the plants growing therein. The cultivator attachments are secured to the frame carrying the wheel and at each side thereof so as to break up the soil adjacent to the row of growing plants, the cups or boxes on the wheel protecting the plants to be reserved and preventing the cultivators from covering them.

My invention will be described in detail hereinafter and illustrated in the accompanying drawings in which—

Figure 1 is a side view in elevation of my improved cotton chopper and cultivator, Fig. 2, a top plan view, and Fig. 3, a cross section of one of the cups or boxes.

In the drawings similar reference characters indicate corresponding parts in the several views.

The frame of my improved machine consists of the side beams 1 having their ends connected by rods 2 and provided with a draft attachment 3 at its front end and handles 4 for the operator at its rear end.

The chopper consists of a wheel 5 journaled in bearings 6 in the free end of spring bars 7 secured at one end to the rear ends of side beams 1.

8 indicates boxes or cups secured to the rim of wheel 5 at equal distances apart thereon and 9 cutting blades secured transversely of the rim of the wheel between boxes or cups 8 and extending radially from the wheel rim. The boxes 8 are as shown preferably made rectangular in plan view and elongated transversely of the tread of the wheel so as to insure covering a plant where the rows are slightly irregular and the knives 9 are substantially the same length as the boxes or cups. The side edges of the boxes or cups are inclined from the rear to the front side, as shown at 10, while the rear side of each box or cup is provided with a rearwardly extending lip 11 on a plane that is substantially a continuation of the plane of the inclined edges 10 of the sides.

12 indicates a cultivator blade secured to each beam 1 at the sides of wheel 5 to break up the soil at the sides of the row.

In operation the wheel is rotated by the forward progress of the machine and the plants except where covered by the cups or boxes 8 are cut to pieces by the blades 9 and covered by the cultivator blades 12. The spring bars 7 on which the wheel 5 is journaled allow for the wheel's rising temporarily to surmount obstacles such as stones, and insure its following the uneven surface of the row of plants. The front edges of the boxes 8 being lower than the rear edges prevents the plants from being scraped or crushed when the boxes are covering them, while the lip 11 extending from the rear edge catches the earth turned by the cultivator blades 12 and throws it far enough away from the growing plant to prevent it from being covered, while the outer side of the lip by engaging the ground insures rotating the wheel until the next succeeding blade engages the earth, so that the box or cup does not drag over the surface and endanger crushing or scraping the covered plant because of non-rotation of the wheel.

Having thus described my invention what I claim is—

1. In a cotton chopper and cultivator, a wheel mounted for rotation, boxes secured at intervals around the rim of the wheel, each of said boxes having a rearwardly extending lip, and chopping implements secured to the wheel between the boxes.

2. In a cotton chopper and cultivator, a wheel mounted for rotation, boxes secured at intervals around the rim of the wheel, each of said boxes having a rearwardly extending lip, and the edges of the sides inclined, and chopping implements secured to the wheel between the boxes.

3. In a cotton chopper and cultivator, a frame consisting of side beams and rods connecting the ends of said side beams, spring bars secured to said side beams, a wheel journaled on said spring bars, boxes secured at intervals around the rim of said wheel, each of said boxes having a rearwardly extending lip, and knives secured transversely of the wheel between the boxes and extending radially from the wheel.

4. In a cotton chopper and cultivator, a frame consisting of side beams and rods connecting the ends of said side beams, spring bars secured to said side beams, a wheel journaled on said spring bars, boxes secured at intervals around the rim of the wheel, each of said boxes having a rearwardly extending lip, and the edges of the sides inclined, knives secured to the wheel between the boxes, and cultivator blades secured to the side beams at each side of the wheel.

In testimony whereof I hereto affix my signature in the presence of two witnesses.

GREEN C. HAMMONDS.

Witnesses:
S. T. ROBERTS,
J. H. McCLURE.